(12) United States Patent
Dingler et al.

(10) Patent No.: US 8,971,862 B2
(45) Date of Patent: Mar. 3, 2015

(54) LOCATION BASED ROUTING AND ADVERTISING FOR STREAMED MEDIA AND MEDIA BLOCKING

(75) Inventors: John R. Dingler, Dallas, GA (US);
Stephen E. Jaffe, Canton, GA (US);
Christopher E. Holladay, Marietta, GA (US); Sri Ramanathan, Lutz, FL (US);
Matthew A. Terry, Dunwoody, GA (US); Matthew B. Trevathan, Kennesaw, GA (US)

(73) Assignee: International Business Machines Corporation, Armonk, NY (US)

(*) Notice: Subject to any disclaimer, the term of this patent is extended or adjusted under 35 U.S.C. 154(b) by 1555 days.

(21) Appl. No.: 12/264,695

(22) Filed: Nov. 4, 2008

(65) Prior Publication Data

US 2010/0112990 A1 May 6, 2010

(51) Int. Cl.
*H04W 4/02* (2009.01)
*H04L 29/08* (2006.01)

(52) U.S. Cl.
CPC *H04W 4/02* (2013.01); *H04L 67/18* (2013.01)
USPC ............... 455/414.2; 455/456.1; 455/456.2; 455/456.3; 455/456.5; 455/434

(58) Field of Classification Search
CPC ................................. H04W 4/02; H04L 29/08
USPC ............... 455/414.1–414.4, 456–456.2, 433, 455/456–456.5
See application file for complete search history.

(56) References Cited

U.S. PATENT DOCUMENTS

| 7,076,244 | B2 | 7/2006 | Lazaridis et al. | |
|---|---|---|---|---|
| 8,355,667 | B2* | 1/2013 | Witzman | 455/3.06 |
| 8,442,524 | B2* | 5/2013 | Jendbro et al. | 455/434 |
| 2002/0087401 | A1 | 7/2002 | Leapman et al. | |
| 2003/0181160 | A1* | 9/2003 | Hirsch | 455/3.02 |
| 2004/0083487 | A1* | 4/2004 | Collens et al. | 725/31 |
| 2005/0282556 | A1 | 12/2005 | Morris | |
| 2006/0136297 | A1 | 6/2006 | Willis et al. | |
| 2006/0258371 | A1* | 11/2006 | Krishnamurthi et al. | 455/456.1 |
| 2009/0011777 | A1* | 1/2009 | Grunebach et al. | 455/456.3 |
| 2009/0094648 | A1* | 4/2009 | Patel et al. | 725/62 |
| 2010/0036970 | A1* | 2/2010 | Sidi et al. | 709/245 |

OTHER PUBLICATIONS

Bharat Rao et al., "Evolution of Mobile Location-based Services", Communications of the ACM, Dec. 2003, vol. 46, No. 12, pp. 61-65.

* cited by examiner

*Primary Examiner* — Michael T Vu
(74) *Attorney, Agent, or Firm* — Matthew Chung; Roberts Mlotkowski Safran & Cole, P.C.

(57) ABSTRACT

A location based service configured to route local advertising for streamed media and media blocking based on a location of the recipient. The method include detecting a location of a mobile user and routing streaming media of a local affiliate to a mobile device of the mobile user based on the detected location of the mobile user.

23 Claims, 3 Drawing Sheets

LOCATION BASED ROUTING AND ADVERTISING FOR STREAMED MEDIA AND MEDIA BLOCKING

FIELD OF THE INVENTION

The invention generally relates to location based services and, in particular, to a location based system that is configured to route local advertising for streamed media and media blocking based on a location of the recipient.

BACKGROUND

Faced with an increasingly difficult challenge in growing both average revenue per user (ARPU) and numbers of subscribers, wireless carriers are trying to develop a host of new products, services, and business models based on data services. One such service is location-based services, which provide information specific to a location including actual locations of a user. It is expected that location based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. Some examples of location-based services that can be provided to the mobile user include:

Providing the nearest business or service, such as an ATM or restaurant;
Providing alerts, such as notification of a sale on gas or warning of a traffic jam;
Providing weather reports which are germane to the location where the user is using the mobile device; and/or
Providing advertisements to end users, e.g., recipients, etc.
For the network carrier, location-based services provide value add by enabling services such as:
Resource tracking with dynamic distribution (e.g., taxis, service people, rental equipment, doctors, fleet scheduling, etc.); and
Proximity-based notification (push or pull) (e.g., targeted advertising, buddy list, common profile matching (dating), automatic airport check-in).

Currently, though, advertising using streaming national content provided by conventional television networks are having problems entering the market because of contractual obligations with local affiliates. A barrier for streamed television services on the mobile devices and to the home is the loss of advertising revenue for local affiliates. Since the location of the client is unknown in normal circumstances, the television service cannot determine the local affiliate. In some cases, a local affiliate can be determined through the use of a user account and the fixed location of the client. But this is not workable when a client is mobile, as in the case of a cell phone. Hardware devices like set top boxes stream the user's home feed to the client. In this model, though, the service provider and the television service do not have control over the user's feed. This method does not allow the streaming service to target advertising to the user's location or block media that should not be streamed to the user at a certain location.

Accordingly, there exists a need in the art to overcome the deficiencies and limitations described hereinabove.

SUMMARY

In a first aspect of the invention, a method comprises detecting a location of a mobile user and routing streaming media of a local affiliate to a mobile device of the mobile user based on the detected location of the mobile user.

In another aspect of the invention, a computer program product comprises a computer usable storage medium having readable program code tangibly embodied in the storage medium. The computer program product is operable to: receive a location of a mobile user; determine that a local affiliate services the received location of the mobile user; and reroute streaming media of the local affiliate to a mobile device of the mobile user based on the received location of the mobile user.

In another aspect of the invention, a method for streaming media to one or more users based on the one or more users' location comprises providing a computer infrastructure. The computer infrastructure is operable to: receive a location of a mobile user; determine that a local affiliate services the received location of the mobile user; determine that streaming media of the local affiliate is not blocked based on an agreement; and route streaming media of the local affiliate to a mobile device of the mobile user based on the received location of the mobile user.

In yet another aspect of the invention, a system comprises a computer infrastructure and computer instructions tangibly embodied on storage medium. The computer instructions comprises at least a first set of instructions that is configured to route streaming media of a local affiliate to a mobile device of a mobile user based on a received location of the mobile device and authorization to stream the media based on a broadcasting agreement.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
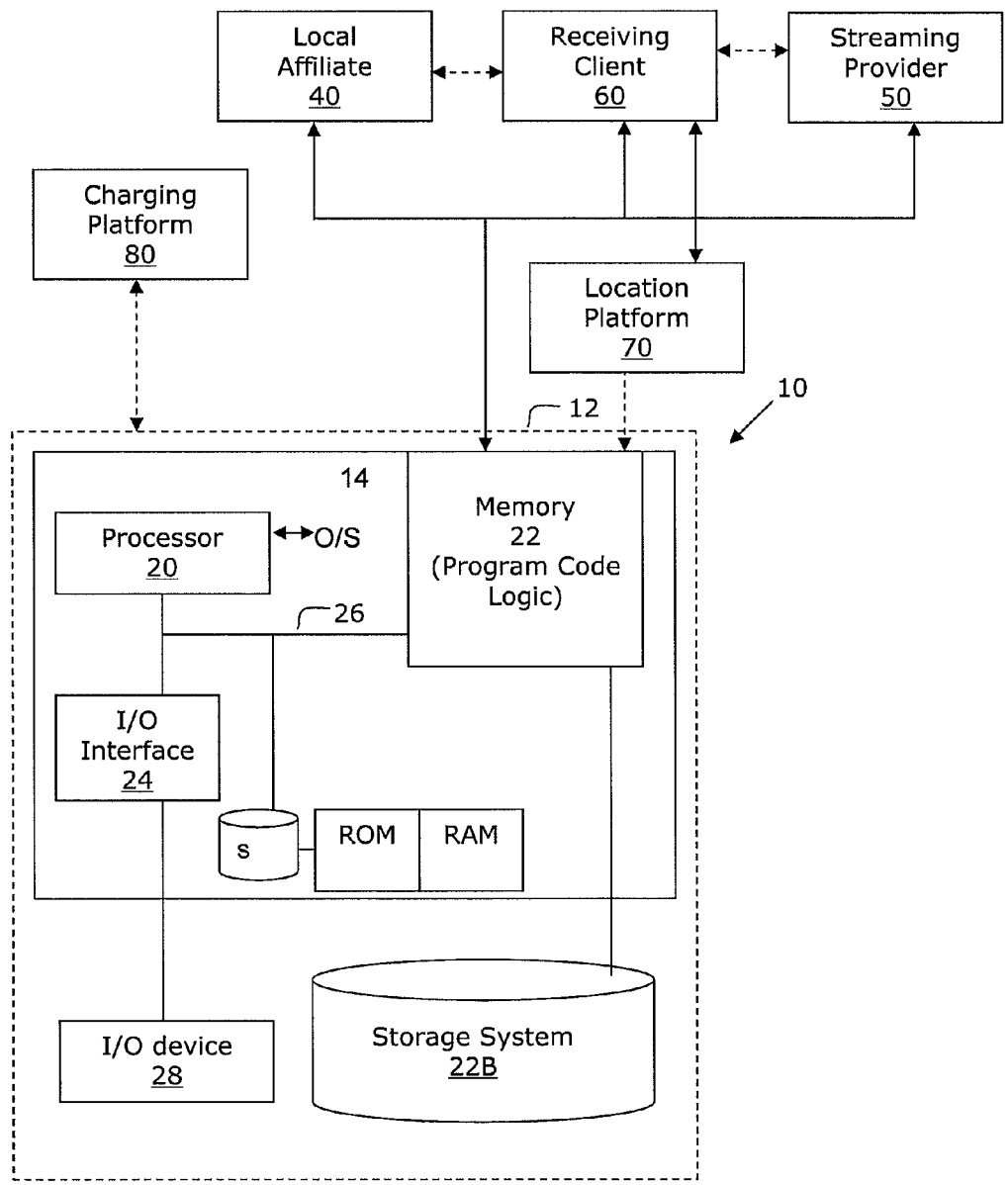
FIG. 1 shows an illustrative environment for implementing processes in accordance with the invention.

The invention generally relates to location based services and, in particular, to a location based system that is configured to route streamed local advertising media and media blocking based on a location of the recipient. More specifically, the system and method of the present invention uses location based information to route a client to a local affiliate stream or deliver local advertising within streamed media based on the location of the user. Under the present invention, the media is streamed advertising content based on the user's location by either delivering a local affiliate stream or a location specific stream from a central location.

Advantageously, by implementing the present invention it is possible to leverage location information to provide streaming media content based on a user's location. In embodiments, the system and method detects a user's location using, for example, a location of a sender's wireless device. The location can be obtained from GPS, A-GPS, or triangulation methodologies, all of which are known to those of skill in the art such that further explanation is not required herein. Although the present invention can use global positioning to provide true granularity to determine a user's exact position, preferably a more generalized location is preferred using, for example, triangulation methodologies, e.g., proximity to a cell tower. Basically, since most local affiliates do not target advertising to exact locations, a more general method is acceptable.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
   a portable computer diskette,
   a hard disk,
   a random access memory (RAM),
   a read-only memory (ROM),
   an erasable programmable read-only memory (EPROM or Flash memory),
   a portable compact disc read-only memory (CDROM), and/or
   an optical storage device.
The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

One of many issues facing the actual commercial deployment of location based services is revenue issues related to the actual dissemination of locally based streamed media. However, the computing infrastructure of the present invention solves such problems by, for example:
   Determining what types of local advertisements and streaming media can be disseminated and blocked based on agreements (broadcasting agreements) with local and national affiliates; and
   Determining revenue sharing with local and/or national affiliates that deliver streamed media based on agreements with local and national advertisers, content providers, etc.
The computing device 14, as discussed in more detail below, uses location based services to determine the local affiliate in order to deliver local advertising within streamed media via a centralized location. In embodiments, computing device 14 also demonstrates the following features:
   The ability to determine a user's location and reroute the user to a local affiliate stream if that stream exists;
   The ability to determine a user's location and target advertising to the user's location if a local affiliate stream does not exist;
   The ability to offer coupon based advertising to supplement the streamed advertisement to provide further incentive for the user to make a purchase of the advertised product or service;
   The ability to allow the television service provider to provide users with additional information about a product or service via their wireless device including the closest location to buy the service or product;
   The ability to provide a mechanism for blocking out events for users located at a given location when the local affiliate is not authorized to broadcast in the detected location; and
   A mechanism for logging when a user did not receive local advertisements or a local feed.

More specifically, FIG. 1 shows an illustrative environment 10 for managing the processes in accordance with the invention. To this extent, the environment 10 includes a server 12 that can perform the processes described herein and implementing the above features. In particular, the server 12 includes a computing device 14. The computing device 14 can be resident on a carrier network infrastructure, content provider server, or other third party service provider such as a local or national television affiliate (any of which is generally represented in FIG. 1).

The computing device 14 includes the computer program code (program control) configured to make computing device 14 operable to perform the services described herein. The program control can be one or computing modules implemented in memory 22A by a service provider such as, for example, a network carrier and/or television affiliate 40 and/or national streaming media provider 50. By using this computing device 14, the network carrier will not have to make any significant infrastructure investments, as the preexisting infrastructure is utilized with the present invention.

The implementation of the program control provides an efficient way in which a local television affiliate 40 and national streaming media provider 50 can provide streaming media to a user 60 (e.g., a user of a mobile device). More specifically, the program control provides an efficient way in which to allow a local television affiliate 40 to provide location based streaming content to user based on the user's location. The local streaming media can be blocked by the program control when it is determined that the user is in a location which is not authorized to receive the streaming media due to contractual obligations with the national affiliate or content provider, e.g., blocked programming based on audience share, etc. That is, the computer program product is operable to block the streaming media for the detected location when the local affiliate is not authorized to broadcast in the detected location. In the case that the local streaming content is blocked, the program control is configured to provide national based streaming media from the national streaming media provider 50. In addition, the program control is configured to provide, when available, streaming local advertisement media from the local television affiliate 40. If local advertisement media is not available, the program control is configured to provide streaming national advertisement media from the streaming media provider 50.

By way of exemplary illustration, the computing device 14 will receive location based information from a location based platform (e.g., network carrier) 70. For example, the location based platform (e.g., network carrier) 70 will receive a request from the computing device 14 and send the location based information of the client 60 to the computing device 14. Although in embodiments, the present invention can use global positioning to provide true granularity to determine a user's exact position, a more generalized location is preferred using, for example, triangulation methodologies, e.g., proximity to a cell tower, provided by the location platform 70. Basically, the level of granularity needed to deliver the services of the present invention only requires a more general location of the user since most local affiliates do not target their advertising to exact location. The location can also be provided directly from the user client 60. By knowing the location of the user, it is now possible to reroute streaming media of a local affiliate to a user based on the location of the user. The streamed media and the delivery thereof can be streaming advertising content or television programming of a local affiliate.

In embodiments, the computing device 14 manages the location based streaming services, and does not require a third-party application to be installed to deliver content. Additionally, the computing device 14 using passive data instead of profile data to deliver content to a user thereby being non-intrusive.

In embodiments, the computing device 14 is configured to offer coupon based advertising to supplement streamed advertising in order to provide additional incentives for potential customers to make a purchase of a product or service. In further embodiments, the computing device 14 allows a television service provider to provide streaming local and/or national advertisements, e.g., provide users additional information about a product, via the users' wireless devices, including the closest locations to purchase products or services. In yet additional embodiments, the computing device 14 provides a mechanism for blocking out events (streamed media) and local advertisements based on the user's location. The computing device 14 can also log or keep track as to whether a user has received a local advertisement. This log can be stored in the storage system 22B.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a wireless handheld device.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a charging platform 80 is maintained to provide charging models to charge for services rendered. The charging platform 80 may be maintained, deployed, created and/or serviced by the service provider. The charging platform 80 is designed to generate a charging record for services rendered to a subscriber. In embodiments, the service provider can calculate an amount to be charged, based on many different considerations and generate the charging record to be sent to the charging platform 80. In turn, the charging platform 80 can generate an invoice and/or deduct a usage charge from an account of the subscriber.

In embodiments, the invention provides a business method that performs the steps of the invention on a subscription, advertising, and/or fee basis. That is, a service provider, such as a Solution Integrator or LBS, could offer to perform the processes described herein. In this case, the service provider can create, maintain, deploy, support, etc., the computer infrastructure that performs the process steps of the invention for one or more customers. The customers may be, for example, a mobile user or a third party requesting streaming media such as a television program. In return, the service provider can receive payment from the customer(s) under a subscription and/or fee agreement and/or the service provider can receive payment from the sale of advertising content to one or more third parties.

Exemplary Processes

Figure 2:
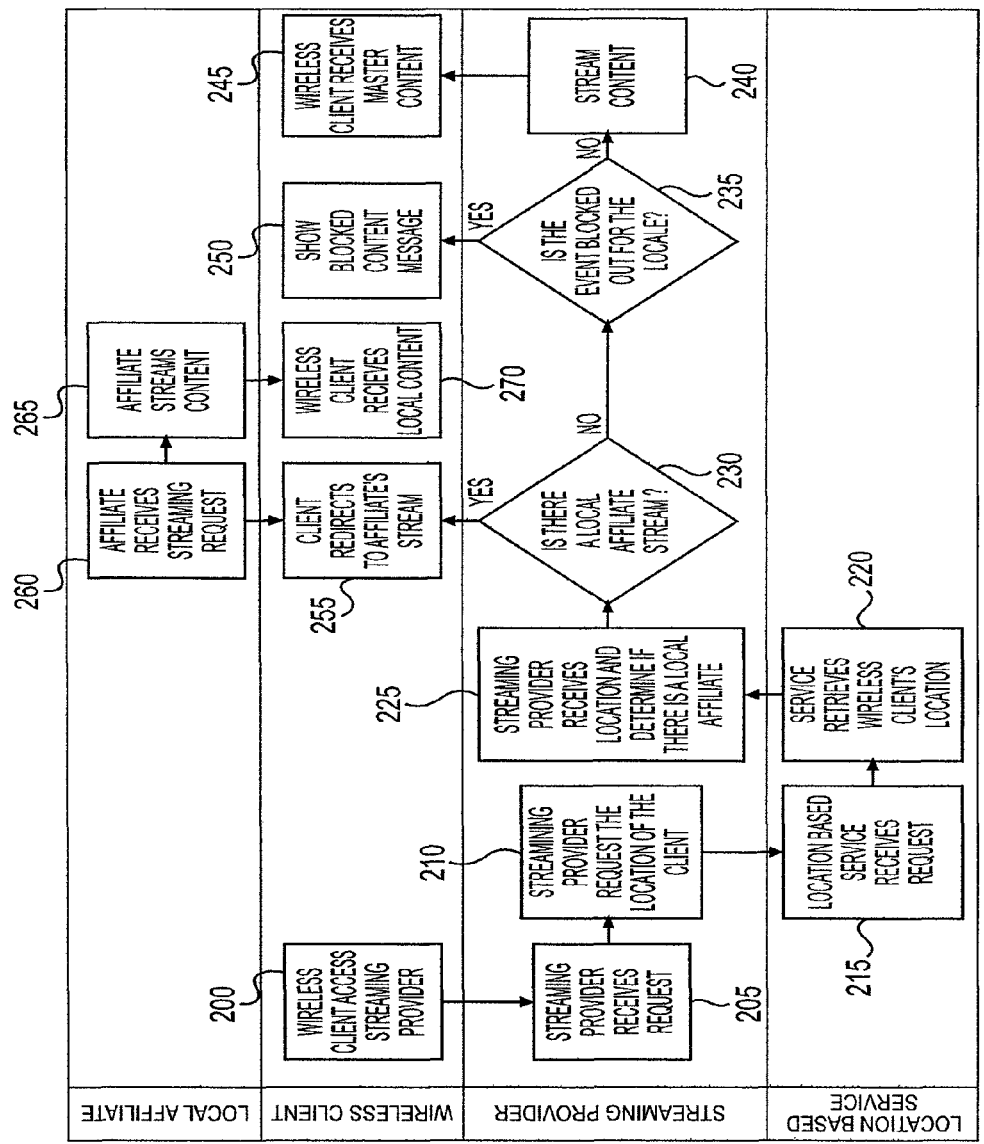
FIG. 2 is a flow diagram showing a process to block or allow local affiliate streams in accordance with aspects of the present invention.
Figure 3:
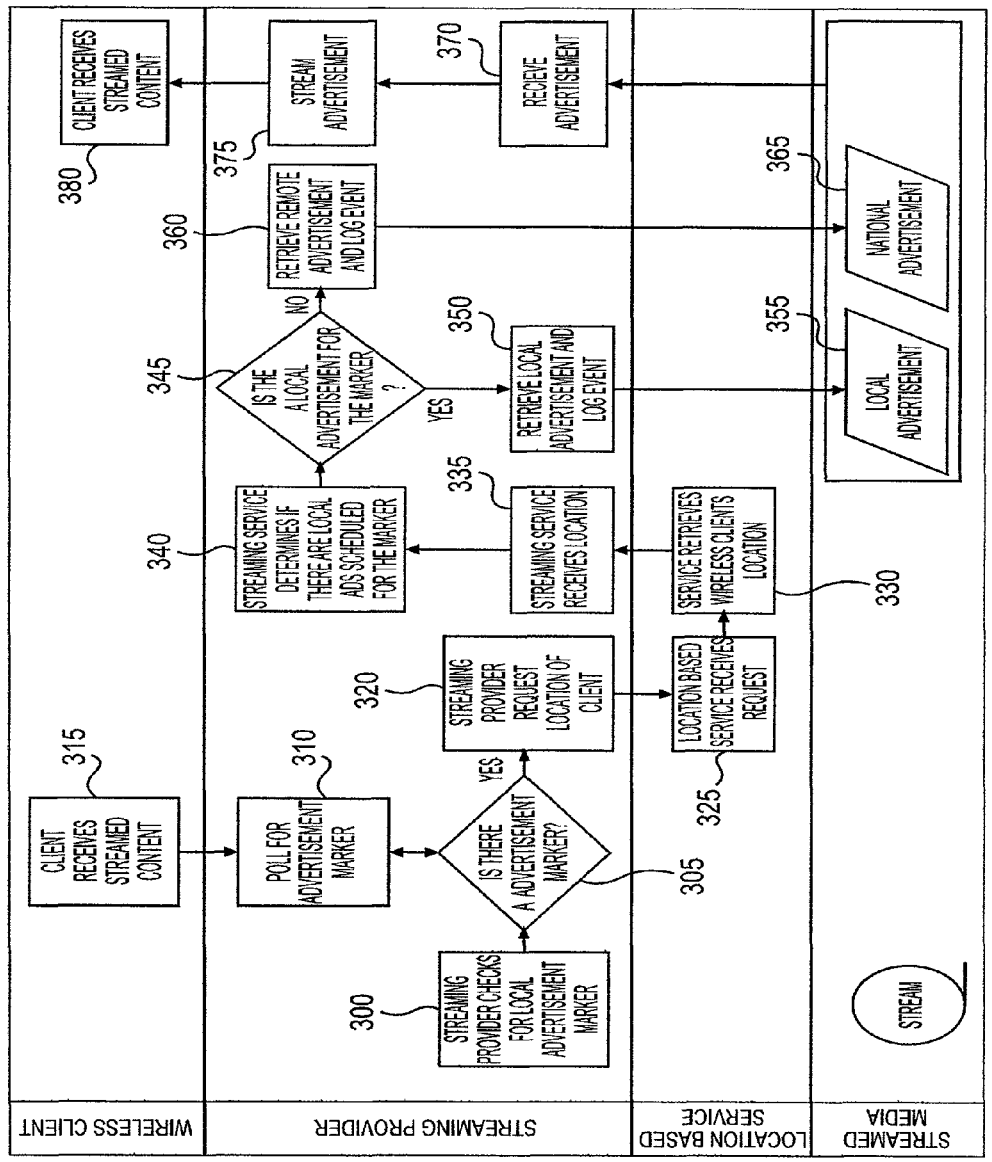
FIG. 3 is a flow diagram showing a process to provide either local or national advertisement streams in accordance with aspects of the present invention.

FIGS. 2 and 3 illustrate exemplary processes in accordance with the present invention. The steps of FIGS. 2 and 3 may be implemented on the computer infrastructure of FIG. 1, for example. The swim lane diagrams (flow diagrams) in FIGS. 2 and 3 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams, and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, the invention is separated into two different flows. For example, the flow of FIG. 2 shows a process to block or allow local affiliate streams in accordance with aspects of the present invention. That is, FIG. 2 is related to determining whether a stream should be a local stream or a national stream based on a location of the user. A local stream is any stream that can be localized to given coordinates. In the case of television broadcast, a local stream is the local affiliate's television broadcast. In contrast, FIG. 3 is a flow diagram showing a process to provide either local or national advertisement streams in accordance with aspects of the present invention.

In the flow of FIG. 2, four players are shown: a location based service, a streaming content provider, a wireless client (user) and a local affiliate. In the flow of FIG. 3 three players are shown: a location based service, a streaming content provider and a wireless client (user). Those of skill in the art should recognize that the location-based service can be provided by the streaming provider, local affiliate, a network carrier or any other third party service provider. Additionally, the local affiliate can be any television affiliate that services a certain locale, such as, for example, Washington D.C.; whereas, the streaming content provider can be any national television affiliate that provides content to the local affiliate.

Referring to FIG. 2, in embodiments, once a user (wireless device) connects to the streaming provider, the streaming provider determines the location of the user by use of a location-based service. Although it is not specifically shown in FIG. 2 (or FIG. 3), the user can provide location information directly to the streaming provider. Once the streaming provider has determined the location of the user, it determines if there is a local feed for coordinates. This can be accomplished by using the coordinates (of the user) in conjunction with a ZIP code lookup table that would allow the streaming provider to correlate the location of the local affiliate with a ZIP code. This mechanism provides a way to cross-reference ZIP codes with a location to determine the local affiliate. If there is no local affiliate for the coordinates, the streaming provider simply provides a national stream to the wireless client.

More specifically, at step 200, a wireless client accesses a streaming provider. At step 205, the streaming provider receives the request. At step 210, the streaming provider requests location information of the client (user). At step 215, the location based service receives the request. At step 220, the service retrieves the location of the user. At step 225, the streaming provider receives the location and determines if there is a local affiliate at step 230. If there is no local affiliate, at step 235, the streaming provider determines if the local event (media content) is blocked for the locale (e.g., when the local affiliate is not authorized to broadcast in the detected location). If the local content is not blocked, at step 240 the local event (media content) is streamed to the user. The user receives the streamed media at step 245. However, if the content is blocked, a block message or other content is streamed to the user at step 250.

Referring back to step 235, if there is a local affiliate, at step 255, the program control will redirect the user to the affiliate's stream. At step 260, the affiliate receives the streaming request. At step 265, the affiliate will stream the content. At step 270, the user will receive the streaming content of the local affiliate.

In FIG. 3, regardless of whether the user is fed a national stream, local affiliates or local advertisers can still advertise via the national stream. The streaming provider can provide this service by looking for advertisement markers within the stream. Once a marker is found, the streaming service checks the location of the user. Once the streaming provider determines the location using the coordinates to determine the ZIP code or using the coordinates and a circular range around the user's current coordinate the streaming provider can provide localized advertisements. If there are no localized advertisements, the national advertisement is given in substitution. In addition to the streamed advertisements, the streaming provider may also use a stored profile for the user and/or the wireless device to target streamed advertisements to a user within a certain geo-boundary during an advertising segment of streamed media. The profile can contain information about the wireless device, its capabilities, and user contact information such as e-mail.

More specifically, at step 300, the streaming provider checks for a local advertisement marker. In embodiments, a marker is placed into a television stream by a national feed to inform local affiliates that there is a spot to advertise for them in the media stream. At step 305, the streaming provider makes a determination as to whether there is an advertisement marker. If there is no marker, at step 310, the streaming provider polls for advertisement markers. At step 315, the user receives streaming content, which may be advertisement provided in response to the polling.

If a marker is found at step 305, the streaming provider requests the location of the user at step 320. The location request is received by a location-based service at step 325. At step 330, the location-based service retrieves the user's location. At step 335, the streaming provider receives the location. At step 340, the streaming provider determines if there are local advertisements scheduled for the marker. More specifically, at step 345, a determination is made as to whether there is a local advertisement for the marker. If there is a local advertisement, at step 350, the streaming provider will retrieve the local advertisement and log the event. At step 355, the local advertisement is streamed. If there is no local advertisement, at step 360, the streaming provider will retrieve a remote advertisement and log the event. At step 365, the remote advertisement is streamed. At step 370, the streaming provider receives either the local or remote advertisement. At step 375, the streaming provider streams the advertisement to the user. At step 380, the user receives the advertisement.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A computer-implemented method comprising:
    detecting, by a computer processor, a location of a mobile user;
    determining, by the computer processor, that a local affiliate is authorized to broadcast in the detected location based on a broadcasting agreement with a national affiliate or a content provider specifying types of local advertisements and streaming media that can be disseminated and blocked; and
    causing, by the computer processor, streaming media of the local affiliate to be routed to a mobile device of the mobile user based on the detected location of the mobile user and the determination that the local affiliate is authorized,
    wherein:
        the determining that the local affiliate is authorized to broadcast in the detected location comprises:
            providing the streaming media when it is determined that content should not be blocked based on the detected location; and
            showing a blocking message in the streaming media when it is determined that content should be blocked based on the detected location; and
        the content is a local event.

2. The method of claim 1, wherein the streaming media includes local advertisements provided by the local affiliates which are placed in the streaming media.

3. The method of claim 1, wherein the detected location is obtained from at least one of a GPS coordinate, A-GPS coordinate and triangulation methodologies.

4. The method of claim 1, wherein the detected location is a generalized location of the mobile user provided by a location based service.

5. The method of claim 1, wherein the streaming media is targeted advertising to the mobile user based on the detected location.

6. The method of claim 1, further comprising requesting that the local affiliate stream the media to the mobile user.

7. The method of claim 1, wherein the steps are provided on a computing infrastructure which is at least one of maintained, deployed, created and supported by a service provider.

8. The method of claim 1, wherein the steps are provided on a software component, a hardware component or a combination of the software component and the hardware component.

9. The method of claim 1, further comprising detecting a marker in the streaming media and placing a local advertisement at the marker, the local advertisement being the streaming media.

10. The method of claim 1, further comprising polling for an advertisement marker in the streaming media.

11. A computer program product comprising a computer readable hardware storage device having readable program code stored on the computer readable hardware storage device, the program code comprising:
    program code to receive a location of a mobile user;
    program code to determine whether a stream of local content is available from a local affiliate that services the received location of the mobile user;
    program code to, when it is determined that the stream of the local content is not available from the local affiliate, determine whether the local content is authorized to be broadcast in the detected location based on a broadcasting agreement with a national affiliate or a content provider specifying types of local advertisements and streaming media that can be disseminated and blocked; and
    program code to reroute the stream of the local content to a mobile device of the mobile user from a streaming media provider based on the received location of the mobile user and the determination that the local content is authorized.

12. The computer program product of claim 11, further comprising:
   program code to, when the stream of the local content is available from the local affiliate that services the received location, redirect the mobile device from the streaming media provider to the locale affiliate that provides the stream of the local content to the mobile device; and
   program code to, when the stream of the local content is determined not to be available from the local affiliate that services the received location and when the local content is not authorized to be broadcast in the detected location, block the stream of the local content from the streaming media provider for the detected location.

13. The computer program product of claim 11, further comprising program code to detect an advertisement marker.

14. The computer program product of claim 13, comprising:
   program code to determine that there is a local advertisement available for the location of the mobile user;
   program code to retrieve the local advertisement; and
   program code to stream the local advertisement to the mobile device of the mobile user by the streaming media provider.

15. The computer program product of claim 14, wherein the local advertisement is provided by the local affiliate.

16. The computer program product of claim 11, further comprising:
   program code to poll for advertisement markers;
   program code to retrieve a local advertisement based on the polling; and
   program code to stream the local advertisement to the mobile user.

17. The computer program product of claim 11, further comprising:
   program code to determine that there is only a remote advertisement available for the location of the mobile user;
   program code to retrieve the remote advertisement; and
   program code to stream the remote advertisement to the mobile user.

18. The computer program product of claim 11, wherein the computer program product is provided on a computing infrastructure which is at least one of maintained, deployed, created and supported by a service provider on a fee and/or subscription basis.

19. A method for streaming media to one or more users based on the one or more users' location, comprising:
   receiving, by a computer processor, a location of a mobile user;
   determining, by the computer processor, that a local affiliate services the received location of the mobile user;
   determining, by the computer processor, that a stream of local content is not available from the local affiliate;
   determining, by the computer processor, that the local content of the local affiliate is not blocked based on an agreement based on a broadcasting agreement with a national affiliate or a content provider specifying types of local advertisements and streaming media that can be disseminated and blocked; and
   routing, by the computer processor, streaming media of the local content from a streaming media provider to a mobile device of the mobile user based on the received location of the mobile user.

20. The method of claim 19, further comprising inserting local advertisements into the streaming media.

21. The method of claim 19, wherein the steps are provided on a software component, a hardware component or a combination of the software component and the hardware component.

22. A computer-implemented method comprising:
   detecting, by a computer processor, a location of a mobile user;
   determining, by the computer processor, that a local affiliate is authorized to broadcast in the detected location; and
   causing, by the computer processor, streaming media of the local affiliate to be routed to a mobile device of the mobile user based on the detected location of the mobile user and the determination that the local affiliate is authorized,
   wherein the determining that the local affiliate is authorized to broadcast in the detected location comprises:
      providing the streaming media when it is determined that content should not be blocked based on the detected location; and
      showing a blocking message in the streaming media when it is determined that content should be blocked based on the detected location; and
   wherein the content is a local event;
   wherein the local affiliate is local television affiliate of a national streaming media provider;
   wherein the streaming media is streamed to the mobile device via a network carrier; and
   wherein the causing the streaming media of a local affiliate to be routed to the mobile device comprises:
      causing the local affiliate to route the streaming media to the mobile device of the mobile user via the network carrier based on a determination that the local affiliate services the detected location and a determination that there is a media stream of the local affiliate, and
      causing streaming media of the national streaming media provider to be routed to the mobile device of the user based on a determination that there is no media stream of the local affiliate and a determination that content of the streaming media of the local affiliate is not blocked in the detected location.

23. The method of claim 22, wherein the content of the streaming media of the local affiliate is blocked in the detected location based on an audience share of a locale including the detected location.

* * * * *